United States Patent [19]

Fox

[11] 3,947,209

[45] Mar. 30, 1976

[54] MECHANICAL EXPANDER FOR ELASTIC MOLDS

[75] Inventor: Terrence S. Fox, Oshkosh, Wis.

[73] Assignee: Lenox Candles, Inc., Oshkosh, Wis.

[22] Filed: Apr. 7, 1975

[21] Appl. No.: 565,355

[52] U.S. Cl. ......... 425/440; 425/803; 425/DIG. 44; 249/127; 249/66 C

[51] Int. Cl.[2] ............................................ B29C 4/00

[58] Field of Search............. 425/440, 803, DIG. 44, 425/17, 19, DIG. 124, 47; 249/134, 127, 161, 66

[56] References Cited

UNITED STATES PATENTS

| | | | |
|---|---|---|---|
| 923,521 | 6/1909 | Herron | 249/161 X |
| 2,337,036 | 12/1943 | Erdle | 425/DIG. 44 X |
| 3,161,792 | 1/1965 | Goldfarb | 425/803 |
| 3,161,938 | 12/1964 | Graham | 425/DIG. 44 |
| 3,233,284 | 2/1966 | MacMillan | 425/19 |
| 3,319,290 | 5/1967 | Clark | 425/DIG. 58 |
| 3,797,979 | 3/1974 | Greenwood | 425/47 |

*Primary Examiner*—J. Howard Flint, Jr.
*Attorney, Agent, or Firm*—Andrus, Sceales, Starke & Sawall

[57] ABSTRACT

An elastic candle mold has a plurality of circumferentially spaced metal plates embedded in the side walls of the mold and which are pulled radially outward simultaneously by individual pull cables, each cable having one end attached to the plate and the opposite end attached to the movable element of an air powered piston-cylinder or other actuator device. A spring mounted on each cable attachment at the mold serves to return the mold and cables to a contracted position for the mold when the piston-cylinder device is reversed.

6 Claims, 6 Drawing Figures

Fig. 3
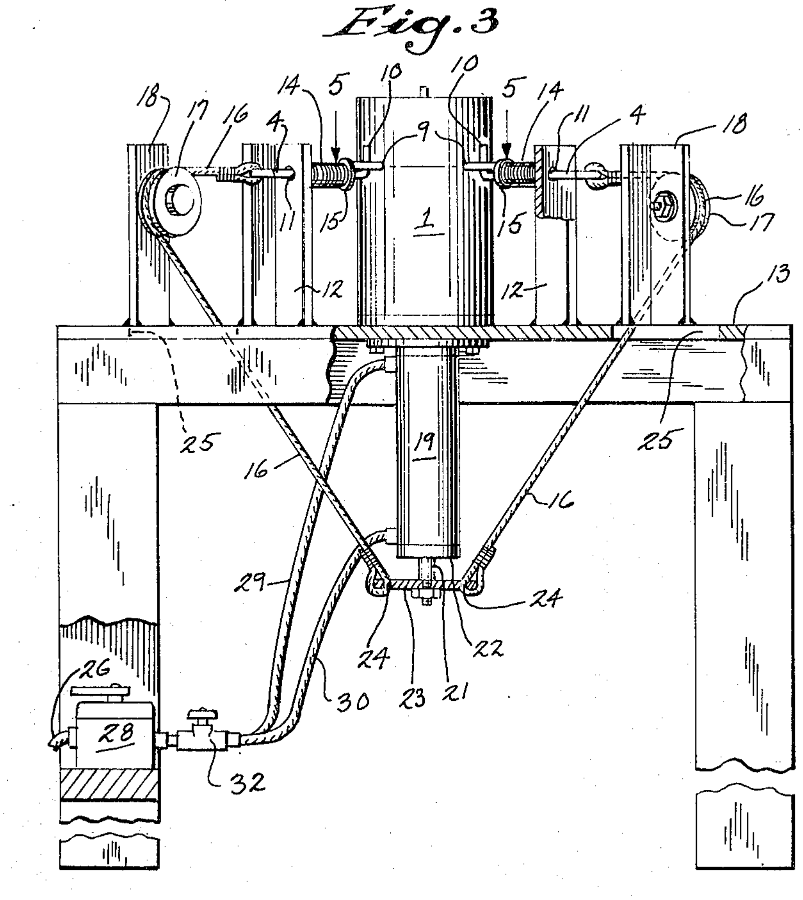
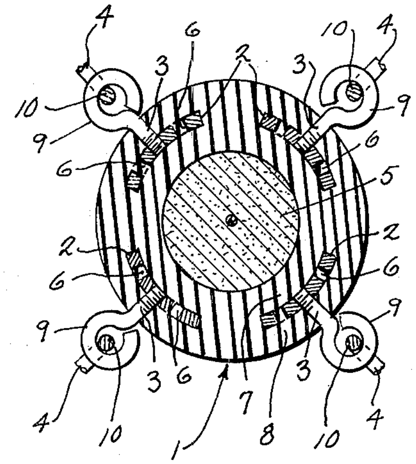
Fig. 5
Fig. 4
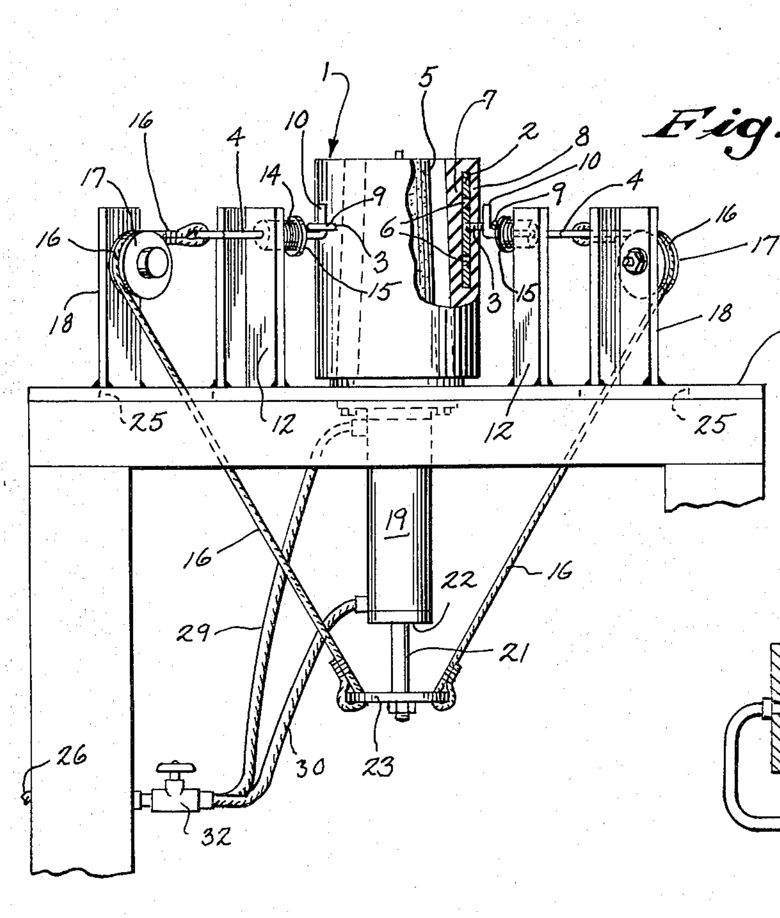
Fig. 6
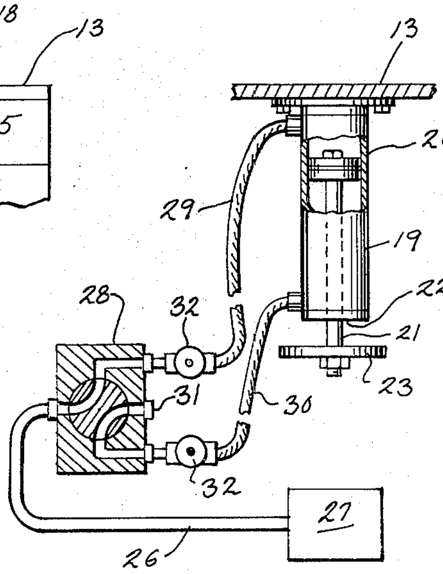

MECHANICAL EXPANDER FOR ELASTIC MOLDS

BACKGROUND OF THE INVENTION

1. Field of the Invention

This invention relates to an expander for elastic molds and has been applied to the art of candle making wherein the elastic mold is expanded by the application of discrete pulling forces to specified attachment points on the mold to release the molded candle and then returned to its contracted position for molding the next candle.

2. Description of the Prior Art

Heretofore elastic molds have been expanded by applying a differential in air pressure between the inside and the outside of the mold, which entails problems of sealing against the elastic mold and thereby is limited in production rate.

SUMMARY OF THE INVENTION

According to the present invention, the elastic mold has two or more expander plates embedded in the side walls thereof and spaced peripherally of the mold, and means are employed to move the plates radially outward to expand the mold and thereby release the molded object for removal.

The expander means preferably embodies a pull rod for each plate attached thereto radially outward thereof, with the rods simultaneously actuated as by one or more air cylinders to effect the desired simultaneous radial movement of the plates.

For this purpose, in the embodiment illustrated a cable is attached at one end to each pull rod and passes over a pulley disposed radially outward from the plate and downwardly from the pulley to the piston rod of an air actuated cylinder piston device disposed axially beneath the mold and in alignment therewith whereby a downward movement of the piston effects a radial outward movement of all of the plates simultaneously, thereby expanding the mold in the direction of movement of the several plates.

A spring on each pull rod assists in returning the same to a retracted position upon reversal of the air cylinder.

BRIEF DESCRIPTION OF THE DRAWINGS

The accompanying drawings illustrate the preferred embodiment presently contemplated by the inventor for carrying out the invention.

In the drawings:

FIG. 3 is a side elevation of the mold and apparatus of FIG. 1;

FIG. 4 is a view similar to FIG. 3 showing the air cylinder actuated to expand the mold as in FIG. 2;

FIG. 5 is a transverse section of the mold taken on line 5—5 of FIG. 3; and

FIG. 6 is a detail view of the air cylinder and the actuating controls therefor.

DESCRIPTION OF THE PREFERRED EMBODIMENT

Figure 1:
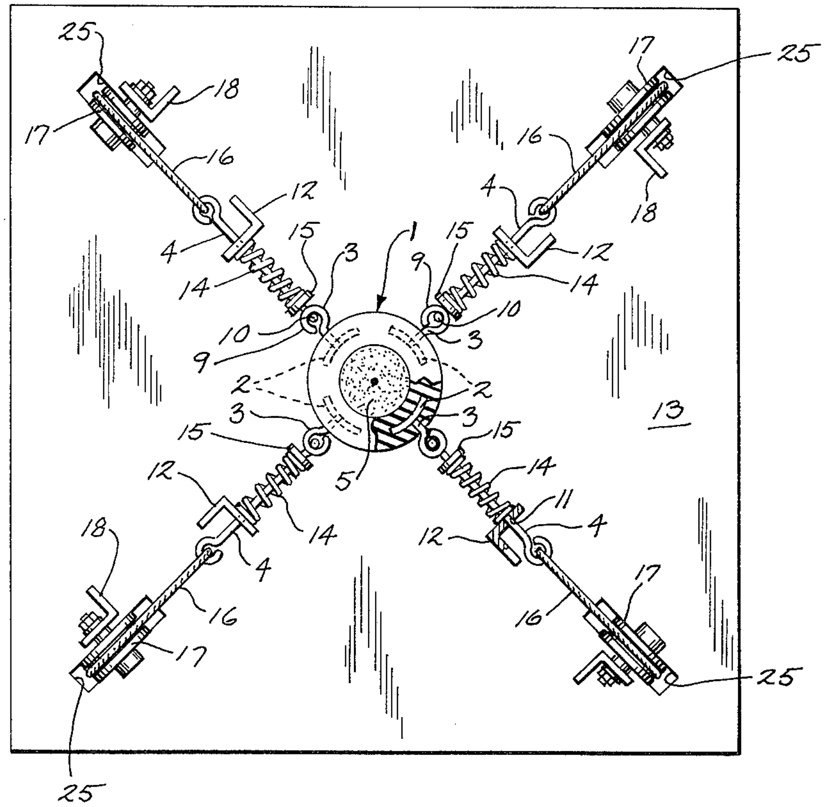
FIG. 1 is a top plan view of the mold and apparatus for expanding the same with a part of the mold broken away and sectioned to show an embedded expander plate.
Figure 2:
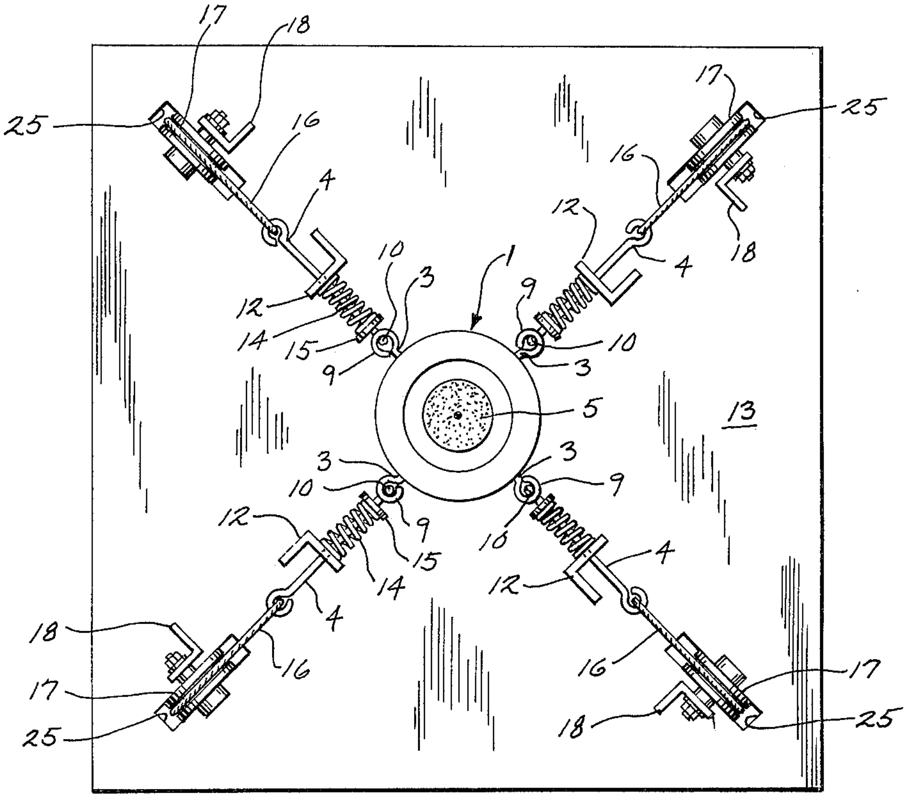
FIG. 2 is a view similar to FIG. 1 showing the mold expanded.

The apparatus disclosed in the drawings comprises in general an elastic mold 1 of generally cylindrical shape in the side walls of which four similar plates 2 are embedded equidistant from each other circumferentially (90° apart on centers), a radial projection 3 extending outwardly from each plate, and individual pull rods 4 attached to the corresponding projections 3 to effect expansion of the walls of the mold outwardly to release the molded object 5.

The object 5 may be of any configuration and moldable material such as a wax candle which may be tapered or may have an irregular shape, in which case the walls of mold 1 may be of varying thickness requiring the mold to be expanded to free the candle for removal.

As shown in the drawings, the cavity for receiving and molding the object 5 is bounded on all sides by the mold 1 and the latter is generally continuous although not necessarily of uniform elasticity throughout.

The walls of mold 1 are themselves cast of a suitable synthetic plastic such as Silastic-rubber made by Dow Corning Corporation of Midland, Michigan with the plates 2 integrally embedded therein.

Plates 2 may be of any desirable size and outline to protect the walls of the mold 1 against undue concentrations of stress, the plates shown being of plate metal generally rectangular in shape and having several openings 6 therethrough to adequately secure the inner surface portion 7 of the mold adjacent the plate to the corresponding outer surface portion 8 by integral mold material filling the openings and joining the portions.

The radial projections 3 may be pre-attached to the corresponding plates 2, or they may be threaded thereinto after the mold is cast.

The outer ends of projections 3 are preferably universally connected to pull rods 4 as by a horizontal loop 9 on each projection receiving an upstanding hook 10 on the inner end of the corresponding pull rod 4, so that the mold can be readily lifted from the apparatus and replaced by a different mold, and further to enable a plate 2 to shift angularly with respect to the pull rod 4 therefor during radial movement as may result from flexing of the wall of mold 1 as it expands.

The pull rods 4 extend radially with respect to mold 1 and are individually mounted to reciprocate in openings 11 at the upper ends of corresponding posts 12 extending upwardly from the top of the bench 13 or other support for the mold 1.

A suitable spring 14 is mounted on each pull rod 4 between the post 12 and a flange 15 on the rod adjacent to hook 10 for the purpose of urging the rod radially inward toward mold 1 to a collapsed position for the mold. Expansion of the mold 1 as by pulling on rods 4 effects compression of springs 14.

The pull rods 4 are actuated outwardly by means of individual cables 16 secured to the outer ends thereof, each passing over an idler pulley 17 rotatably carried by an upstanding post 18 on bench 13 and disposed in the general vertical axial plane of the corresponding rod 4.

Any suitable power means such as an hydraulic or air cylinder 19 is preferably suspended beneath bench 13 in line with mold 1 and has a piston 20 reciprocally operable therein with a piston rod 21 extending downwardly through a closed end 22 of the cylinder.

The outer lower end of piston rod 21 has a transverse disc 23 with four holes 24 therethrough for securing the lower ends of the corresponding cables 16 to the piston rod, the holes 24 being equally spaced circumferentially of disc 23.

The cables 16 pass down freely through openings 25 in the top of bench 13, and are adjusted to be of equal length to provide for simultaneous equal movement of plates 4 when the cylinder 19 is actuated to push piston rod 21 downwardly.

The cylinder 19 is illustrated as double acting with air pressure selectively admitted to both ends thereof on opposite sides of piston 20.

For this purpose, the compressed air line 26 from any source 27 of compressed air usually available in most shops feeds into a four way valve 28 to two lines or passages 29 and 30 to the upper and lower ends, respectively, of cylinder 19.

Valve 28 may be of any suitable construction with an oscillating member of either the rotary or plunger type which connects line 26 to line 29 and at the same time connects line 30 to a discharge opening 31 when it is desired to expand mold 1 to release object 5.

Upon removal of object 5 from the mold the oscillating member of valve 28 is moved to the opposite position where it connects line 26 with line 30 to raise piston 20 in cylinder 19, and at the same time valve 28 connects line 29 to a discharge opening 31 to release the air above piston 20.

If desired, an adjustable speed control may be provided for actuation of piston 20 in the form of suitable adjustable restrictions 32 in passages 29 and 30.

Also, if desired, the valve 28 may be automatically actuated in sequence with repeated molding operations to provide maximum production of a given object.

Various embodiments of the invention may be employed within the scope of the following claims which particularly point out and distinctly claim the subject matter of the invention.

I claim:

1. In combination with an elastic mold, a mechanical expander comprising a generally continuous elastic mold, a plurality of expander means spaced peripherally of the mold and secured thereto, and means to move said first named means radially of the mold to expand the latter.

2. The construction of claim 1 in which said first named means comprise plates embedded in the walls of the mold and means secured to said plates for attaching said second named means thereto.

3. The construction of claim 1 in which said second means comprises a pull rod attached to each of said expander means, and means to move said pull rods radially relative to the mold.

4. The construction of claim 3 in which said last named means comprises a cable attached at one end to each pull rod, and power means operably connected to the opposite ends of said cables to actuate the same simultaneously.

5. The construction of claim 4 and spring means operably connected to said pull rods to return the same to a retracted position for the mold upon release of said cables by said power means.

6. The construction of claim 5 in which said power means comprise a double acting power cylinder, and means to alternately actuate the same to effect expansion and contraction of the mold in relation to molding operations.

* * * * *